United States Patent [19]
Hefren

[11] 3,848,885
[45] Nov. 19, 1974

[54] STABILIZER APPARATUS FOR ROAD VEHICLES

[76] Inventor: Fred W. Hefren, 3814 Eisenhower, Odessa, Tex. 79762

[22] Filed: Dec. 10, 1973

[21] Appl. No.: 422,998

[52] U.S. Cl.................................... 280/94, 267/150
[51] Int. Cl.............................................. B62d 7/08
[58] Field of Search..................... 280/94, 96.2, 268; 267/150

[56] References Cited
UNITED STATES PATENTS

| | | | |
|---|---|---|---|
| 1,210,490 | 1/1917 | Kittle | 280/94 |
| 1,346,211 | 7/1920 | Johnson | 280/94 |
| 3,375,020 | 3/1968 | Worsham | 280/96.2 R |
| 3,448,991 | 6/1969 | Leggett | 280/94 |

FOREIGN PATENTS OR APPLICATIONS

| 2,592 | 7/1926 | Australia | 280/94 |
|---|---|---|---|

*Primary Examiner*—Leo Friaglia
*Attorney, Agent, or Firm*—Marcus L. Bates

[57] ABSTRACT

A stabilizer apparatus which can be interposed within the steering system of a road vehicle so that movement of the steering wheels away from a neutral position is resisted by a spring assembly.

10 Claims, 12 Drawing Figures

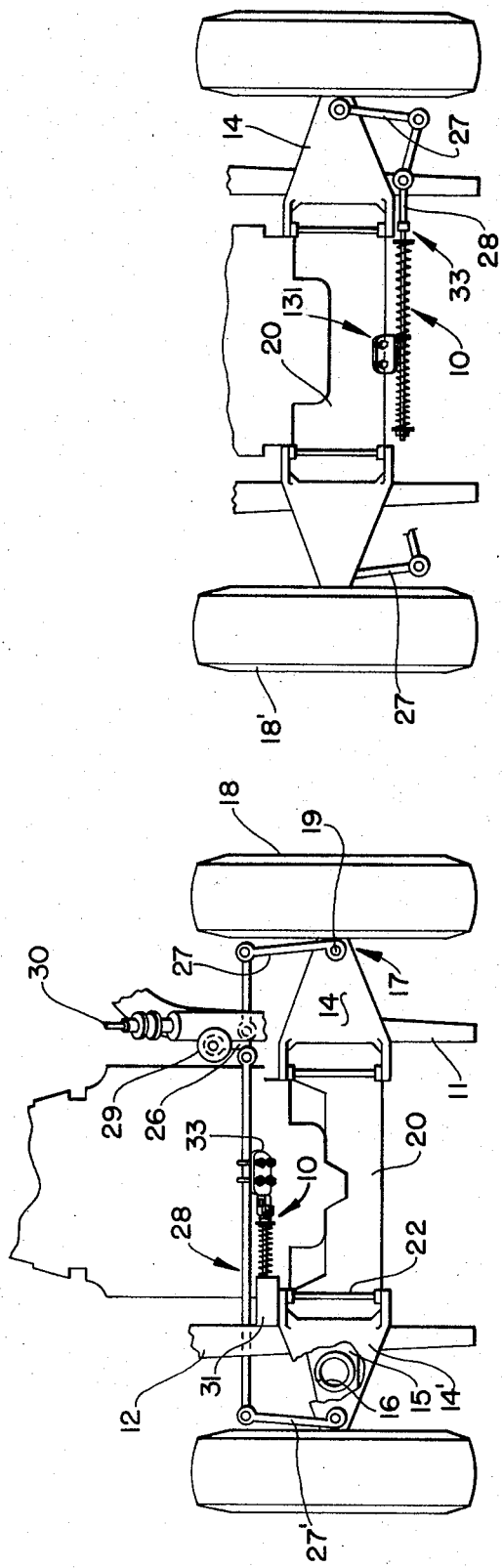

PATENTED NOV 19 1974

STABILIZER APPARATUS FOR ROAD VEHICLES

BACKGROUND OF THE INVENTION

Road vehicles, such as automobiles and trucks, are often wrecked when unusual conditions are encountered, such as severe cross winds, tire blow outs, or when the vehicle is traversing irregular or rough road surfaces.

Various solutions to the above problems are set forth in the following prior art to which reference is made for further background of the invention: Leggett U.S. Pat. No. 3,448,991; Worsham U.S. Pat. No. 2,993,704; Worsham U.S. Pat. No. 3,375,020; Bishop U.S. Pat. No. 3,333,863, and to the various references made of record therein.

Installation of the various above referenced stabilizer apparatus is often difficult and time consuming. Usually the vehicle wheel must be removed so that additional parts may be added thereto for accommodation of the stabilizer assembly.

Accordingly, it is desirable to have a stabilizer assembly for improving the steering mechanism of a vehicle which can be attached thereto in an uncomplicated, easy, and economical manner without disassembling any parts of the steering mechanism of the vehicle.

SUMMARY OF THE INVENTION

This invention relates to a stabilizer apparatus for the steering mechanism of a vehicle comprised of spaced fixed and movable mounting brackets having spring means associated therewith so that the brackets must compress a spring when moved towards and away from one another.

The brackets are fabricated in a special configuration which enables rapid attachment to the steering system of a number of different types of vehicles so that each steerable wheel of the vehicle is always biased into the neutral steering position.

Specifically, the stabilizer apparatus is comprised of a fixed and a movable mounting bracket spaced from one another and arranged with the fixed mounting bracket attached to either the axle, the frame, or the cross member of the vehicle. The movable mounting bracket is attached to the linkage which imparts movement into the steerable wheel. A spring biased shaft is reciprocatingly received through the fixed mounting bracket so that axial movement of the shaft in either longitudinal direction is resisted by a compression spring.

Therefore, a primary object of the present invention is the provision of a stabilizer for the steerable wheels of a vehicle which can be directly attached to the steering mechanism.

Another object of the invention is to provide improvements in stabilizers for the steering systems of vehicles having steerable wheels mounted by a knee action type suspension system.

A further object of this invention is to disclose and provide improvements in stabilizers for steering systems of vehichles which have a solid front axle.

A still further object of this invention is to provide a stabilizer apparatus in combination with the steering system of a road vehicle which tends to maintain the steering wheels thereof biased into a neutral steering position.

Another and still further object of the invention is to provide improvements in stabilizer apparatus for the steering system of a road vehicle which enables the improvement to be installed on the vehicle without disassembly thereof.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a fragmentary bottom view of a road vehicle which discloses the present invention operatively associated therewith;

FIG. 2 is a fragmentary bottom view of another road vehicle which sets forth a modification of the apparatus disclosed in FIG. 1;

DETAILED DESCRIPTION OF THE INVENTION

Figure 3:
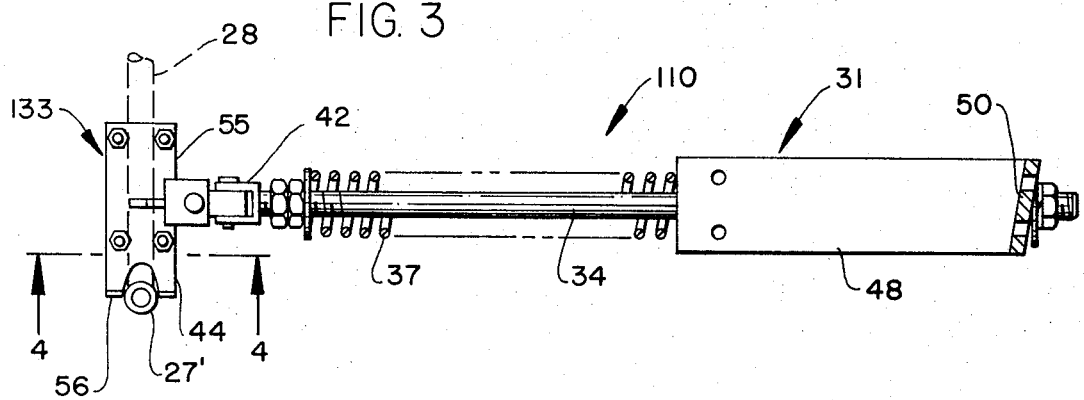
FIG. 3 is a fragmentary, part cross-sectional view taken along line 3—3 of FIG. 4.

FIG. 1 schematically discloses a road vehicle, such as an automobile or a truck or motorhome, with the present invention being operatively associated therewith in the manner generally indicated by the numeral 10. The vehicle has conventional spaced longitudinal frame members 11 and 12 which support a knee action suspension system comprised of spaced upper and lower arems 14 and 15, with a spring 16 being interposed between the frame and one of the arms in the usual manner.

A spindle, generally indicated by the arrow at numeral 17, is journaled at the free end of the arms in the usual manner so that spaced steerable wheels 18 may be pivoted or turned about a pviot or turning point 19. Cross-member 20 is tied to the frame, while the arms are attached to the cross-member by means of a through bolt 22.

The steering system is conventional in design and is comprised of a rod assembly which includes drive arm 26, spindle arm 27, and relay arm 28. GGear box 29 is actuated by steering wheel shaft 30 to impart linear motion into the relay rod 28.

The stabilizer apparatus of the present invention includes a fixed mounting bracket 31 affixed to the longitudinal from member 12, and a movable bracket member 33 attached to relay rod 28 of the conventional steering system.

In FIG. 2, the fixed mounting bracket 131 of the stabilizer apparatus is affixed to the cross-member 20 while the movable mounting bracket 33 is affixed to the relay rod 28 in a manner similar to the embodiment of FIG. 1.

Throughout the remainder of this disclosure, wherever it is possible or logical to do so, like or similar numerals will refer to like or similar elements.

Figure 4:
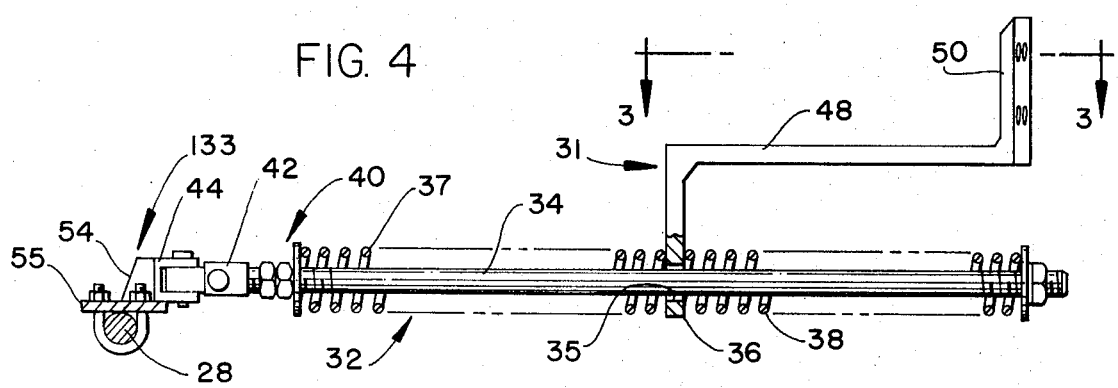
FIG. 4 is a fragmentary, part cross-sectional view of the stabilizer apparatus disclosed in FIG. 3.

In the embodiment disclosed in FIGS. 3 and 4, a compression spring assembly 32 is supported by the fixed mounting bracket 31 and includes a shaft 34 slidably received through aperture 35 formed in the free depending end 36 of the mounting bracket.

Spaced compressed spiral wound coil springs 37 and 38 are spaced from one another by the depending end 36 of the fixed mounting bracket. The opposed marginal ends of the shaft each threadedly receives a spring retainer means 39, 40 thereon, to facilitate adjustment and replacement of the apparatus. As seen in FIGS. 3 – 6, clevis 42 and 44 are interconnected by means of block 43, with the block being apertured at each opposed marginal end thereof and pivotally connected by a clevis pin to provide a universal joint between the movable mount 133 and the spring retainer 40.

The fixed mounting bracket of FIGS. 3 and 4 receives the underside of the longitudinal frame member 12 of FIG. 1 in abutment with the horizontal member 48, while vertical member 50 is bolted onto a vertical web member of the frame member by means of the illustrated apertures. The movable mount assembly is reinforced by means of a web 54 so that U-bolts 55 can transmit motion from the spindle are 28' into the shaft 34.

Figure 5:
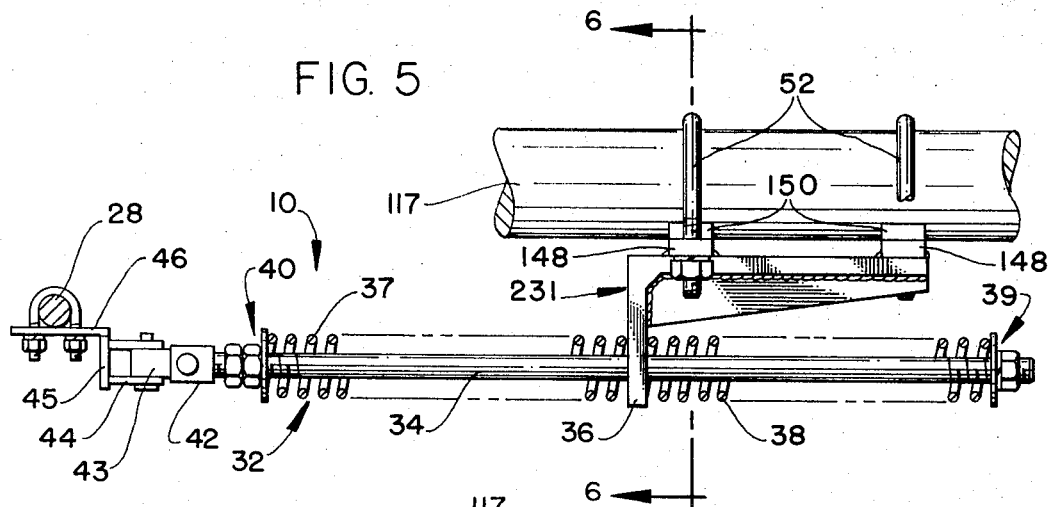
FIG. 5 is a fragmentary, part cross-sectional representation of another form of the present invention.
Figure 6:
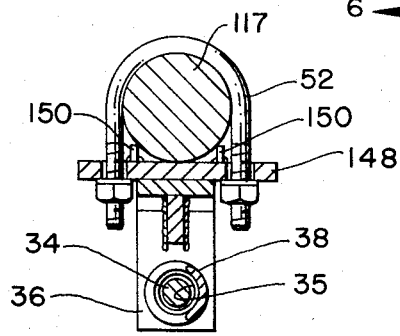
FIG. 6 is a cross-sectional view taken along line 6—6 of FIG. 5.

Looking more particularly now to the embodiment disclosed in FIGS. 5 and 6, the fixed mount is seen to be attached to the axle 117, such as employed in a four-wheel drive vehicle, by means of the illustrated cradle blocks 150 and U-bolts 52. Pad 148 provides outwardly depending ears which receive the free marginal end portions of the U-bolts therethrough. The movable mount means includes a vertical member 45 which is attached to a horizontal member 46, with the last member being attached to the relay rod by means of the illustrated U-bolts.

Figure 7:
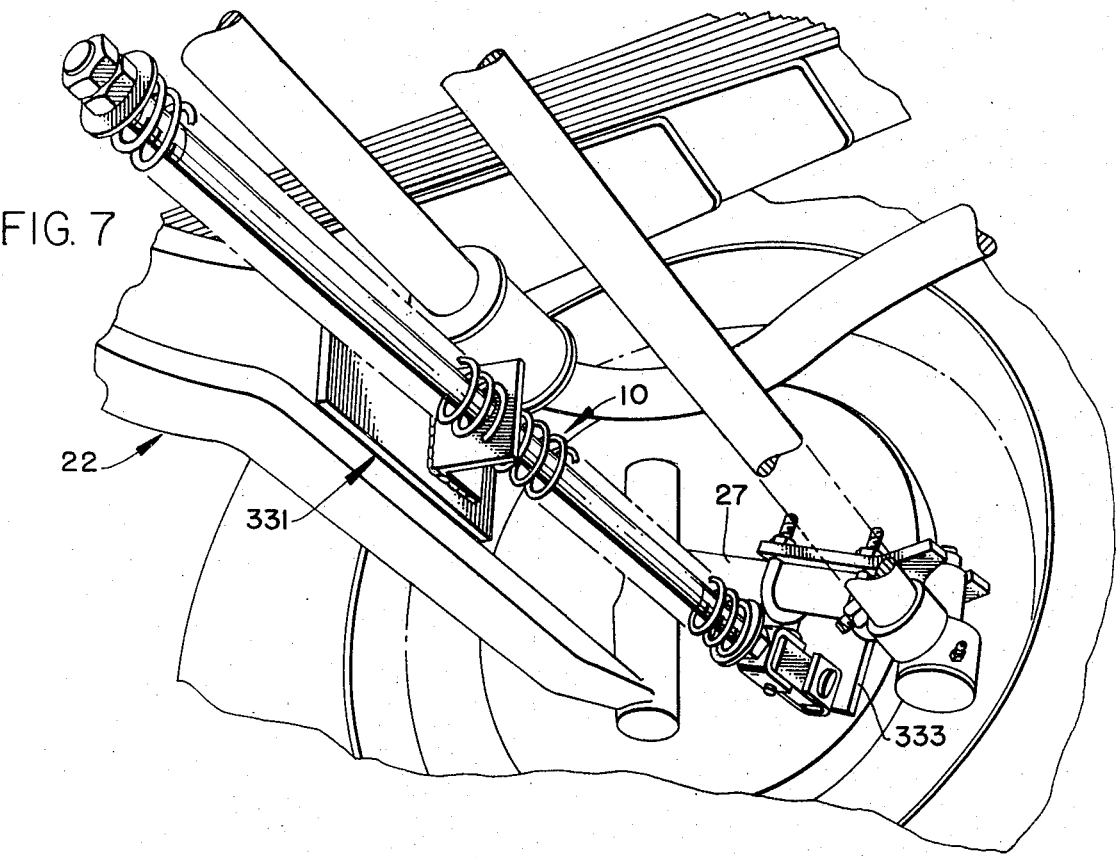
FIG. 7 is a fragmentary, part cross-sectional, perspective view which discloses the present invention in combination with the steering system of a road vehicle.

FIG. 7 illustrates the present invention operatively installed on a truck having a solid axle 22. The fixed mount 331 is removably but rigidly affixed to a vertical face of the axle, while the movable mount 333 is clamped about the pitman arm in the same manner illustrated at 133 in FIGS. 3 and 4.

Figure 8:
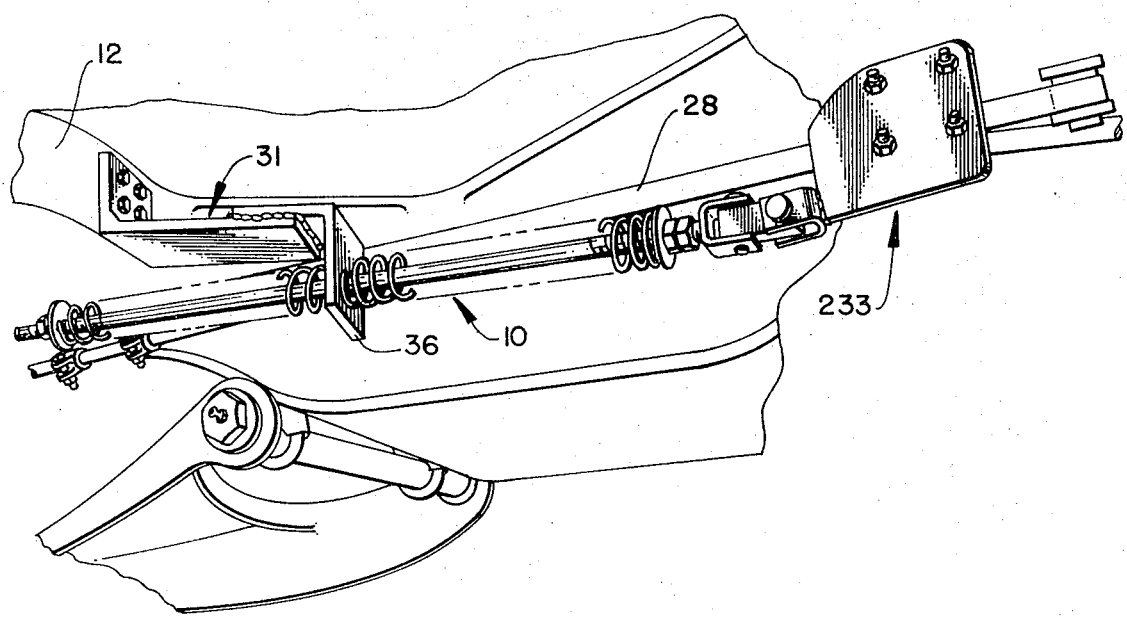
FIG. 8 is a fragmentary perspective view which discloses another embodiment of the present invention in combination with a road vehicle.
Figure 9:
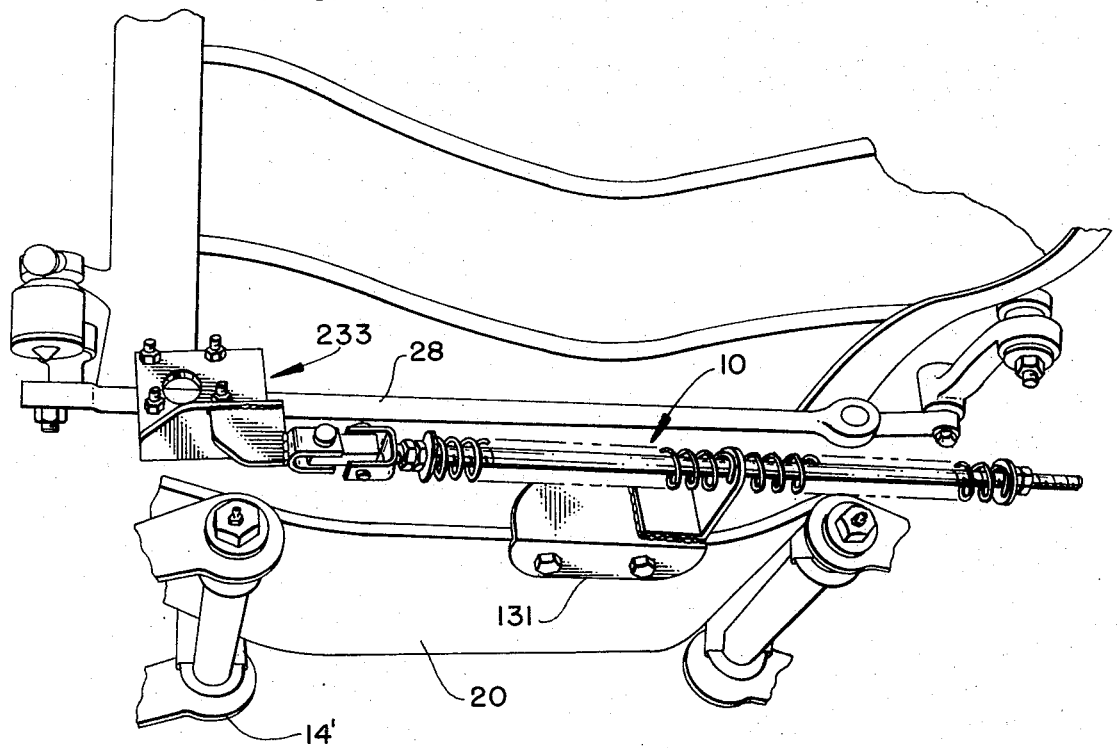
FIG. 9 is a fragmentary perspective view of still another embodiment of the present invention.

In FIG. 8 the fixed mount 31 is attached to the longitudinal frame member 12 while the movable mount 233 is attached to the relay rod 28. In FIG. 9, the stabilizer apparatus of the present invention has the fixed mount 131 thereof attached to the underside of the cross-member 20, while the movable mount member 233 is clamped to the relay rod 28.

Figure 10:
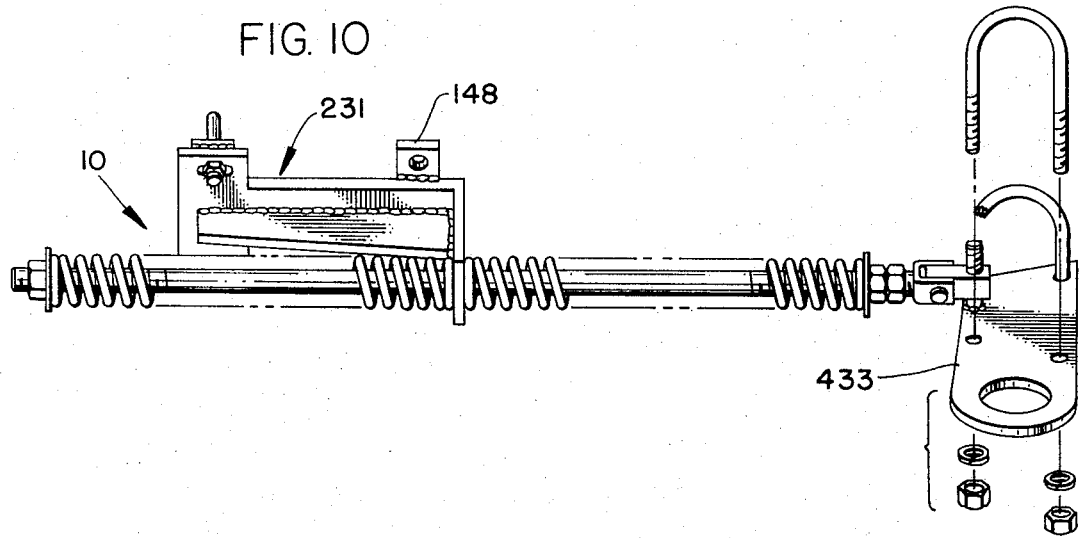
FIGS. 10 and 11 are enlarged perspective views showing specific details of part of the foregoing embodiments of the present invention; and, FIG. 12 sets forth a perspective view of some parts of the invention disclosed in some of the foregoing figures.
Figure 11:
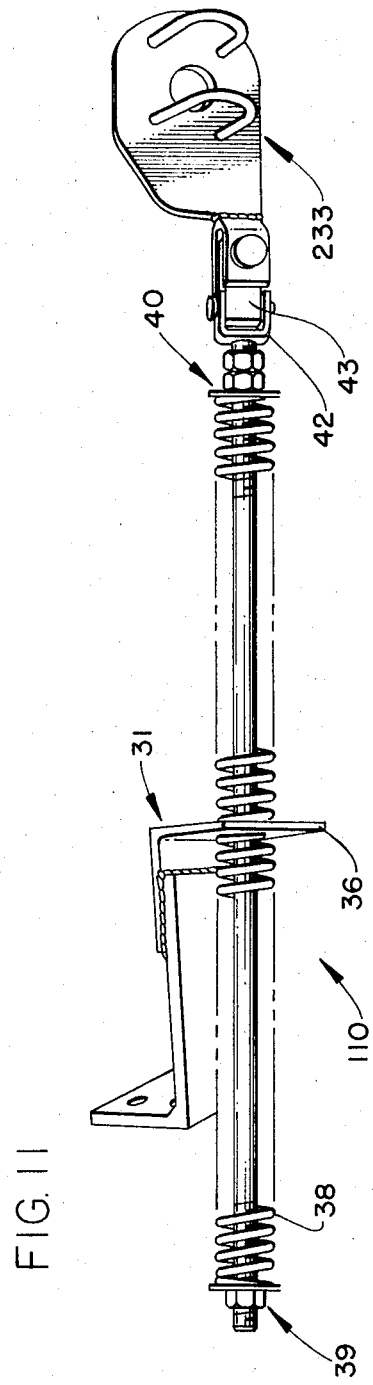
Figure 12:
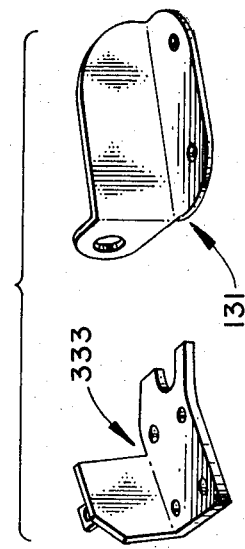

FIGS. 10 – 12 disclose the stabilizer apparatus of the present invention apart from the vehicle to which it is to be mounted. As seen in FIG. 10, a fixed bracket 231 has been incorporated with a movable bracket 433 of a type which can be removably affixed to a spindle arm, with the tie rod end of the spindle arm being received through the illustrated enlarged aperture, in a manner similar to the illustration of FIG. 8.

In FIG. 11, the before mentioned fixed bracket 31 has been incorporated with a movable bracket 233 of the type similar to the disclosure of FIG. 9. FIG. 12 illustrates the use of the fixed bracket 131 of FIG. 9 and movable bracket 333 of FIG. 7.

OPERATION

In operation, the stabilizer assembly of the present invention is selected in accordance with the basic design of the steering system of the vehicle with which it is to be combined. Where the vehicle is provided with a four wheel drive system, the apparatus disclosed in FIGS. 5, 6, and 10 is selected so that the fixed mount can be bolted directly to the front straight axle, while the movable mount is selected so that it can be attached to either the spindle arm or to the radius rod, as may be most expedient.

On the other hand, where the front suspension system is of the A-frame or knee-action type, the embodiments disclosed in FIGS. 1 or 2 are preferably employed. Knee-action assemblies such as may be associated with motorhomes or the like are preferably arranged in accordance with the teachings of FIGS. 1, 3, and 4; while light weight "pick-up" trucks and the like are preferably provided with a stabilizer assembly such as disclosed in FIGS. 2 and 9.

The improved stabilizer apparatus of the present invention can be affixed directly to the steering system of a vehicle without the necessity of disassembly of any components thereof merely by bolting the fixed mount into its appropriate location and thereafter attaching the movable mount to either the spindle arm or the radius rod by utilizing the U-bolts provided therefor. If care is taken to neutralize the steering wheel prior to installation of the stabilizer apparatus, no further adjustment thereof will be required.

Should subsequent adjustment of the steering characteristics of the vehicle be required, the spring retainers may be positioned respective to the fixed mount by means of the attendant adjusting lock nuts.

In one stabilizer apparatus made in accordance with the present invention, the following springs were found to be satisfactory: 1¼ inches hole diameter; five-eighths inch rod diameter; 6 inches free length; 375 pound load at solid height; 15 pound load at one-eighth inch deflection; with the material of construction being chrome vanadium steel. The springs were preloaded or placed in compression by tightening the adjustment nuts at the free end portion of the shaft an amount to compress the springs about one-half inch of their unloaded length.

In the claims, the term "steering system" is intended to relate to either the spindle arm or to a rod tied thereto; while the term "means by which said fixed mounting bracket is connected in fixed relationship with respect to said movable bracket" is intended to relate to structure associated with the vehicle frame.

The present invention, when used in combination with a road vehicle, resists movement of the steering wheels away from any predetermined neutral position. For this reason, should any external force tend to displace the steering wheels, the stabilizer apparatus will automatically resist the intervening force and assist steering of the vehicle in the proper direction.

I claim:

1. In a road vehicle, provided with a running gear in the form of a wheel suspension system with one of the wheels being a steering wheel mounted for horizontal turning about a turning axis by a pitman arm connected thereto, and having a steering system which includes a rod assembly connected for moving the pitman arm, the improvement comprising:

a steering gear stabilizer apparatus for resisting turning movement of the steering wheel about the turning axis; said stabilizer apparatus comprising a single fixed mounting bracket, a shaft having opposed ends, compression springs, a universal joint, spring retainers, and a movable mounting bracket;

means by which said shaft is reciprocatingly received in supported relationship respective to said fixed mounting bracket;

said springs being spaced from one another by said fixed mounting bracket;

said spring retainers being affixed to opposed ends of said shaft in a position to bias each of said springs towards said fixed mounting bracket;

said universal joint connecting one end of said shaft to said movable bracket;

means by which said movable mounting bracket is affixed to said steering system; means by which said fixed mounting bracket is connected in fixed relationship with respect to said movable bracket;

so that turning movement of the wheel about the turning axis is resisted by one of said compression springs.

2. The improvement of claim 1 wherein said fixed mounting bracket is affixed to the main frame of the vehicle.

3. The improvement of claim 1 wherein said fixed mounting bracket is affixed to a cross-member of the vehicle.

4. The improvement of claim 1 wherein said movable bracket is affixed to the pitman arm of the steering system.

5. The improvement of claim 1 wherein said fixed mounting bracket is affixed to the main frame of the vehicle and said movable bracket is affixed to the pitman arm of the steering system.

6. In combination with a steerable vehicle having a steerable wheel supporting the vehicle and turnable about a turning axis, a stabilizer apparatus, said stabilizer apparatus comprising a single fixed mounting bracket, a shaft having opposed ends, compression springs, a universal joint, spring retainer, and a movable mounting bracket;

means by which said shaft is reciprocatingly received in supported relationship respective to said fixed mounting bracket;

said springs being spaced from one another by said fixed mounting bracket;

said spring retainers being affixed to opposed ends of said shaft in a position to bias each of said springs towards said fixed mounting bracket;

said universal joint connecting one end of said shaft to said movable bracket;

means by which said movable mounting bracket can be connected to said steering system;

means by which said fixed mounting bracket can be connected to said vehicle in fixed relationship with respect to said movable bracket;

so that turning movement of the steerable wheel about the turning axis is resisted by one of said compression springs.

7. The combination of claim 6 wherein said fixed mounting bracket is affixed to the main frame of the vehicle.

8. The combination of claim 6 wherein said fixed mounting bracket is affixed to a cross-member of the vehicle.

9. The combination of claim 6 wherein said movable bracket is affixed to the pitman arm of the steering system.

10. The combination of claim 9 wherein said fixed mounting bracket is affixed to the main frame of the vehicle.

* * * * *